United States Patent
Kim

(10) Patent No.: US 6,697,366 B1
(45) Date of Patent: Feb. 24, 2004

(54) ETHERNET MEMORY MANAGEMENT SYSTEM AND METHODS FOR OPERATION THEREOF

(75) Inventor: San-Hong Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/442,790

(22) Filed: Nov. 18, 1999

(30) Foreign Application Priority Data

Nov. 18, 1998 (KR) ............................................. 98-49387

(51) Int. Cl.[7] ........................ H04L 12/54; H04L 12/56; G06F 12/00
(52) U.S. Cl. ........................ 370/392; 370/412; 370/429; 711/171
(58) Field of Search ................................ 370/412, 392, 370/428, 429; 711/170, 171

(56) References Cited

U.S. PATENT DOCUMENTS

| | | | | |
|---|---|---|---|---|
| 5,199,051 A | * | 3/1993 | Nakabayashi et al. ...... | 375/369 |
| 5,313,582 A | * | 5/1994 | Hendel et al. ................. | 710/56 |
| 5,339,411 A | * | 8/1994 | Heaton, Jr. .................. | 711/171 |
| 6,088,777 A | * | 7/2000 | Sorber ......................... | 711/171 |
| 6,167,480 A | * | 12/2000 | Williams et al. ............. | 710/260 |
| 6,181,705 B1 | * | 1/2001 | Branstad et al. ............. | 370/412 |
| 6,212,660 B1 | * | 4/2001 | Joeressen et al. ........... | 714/758 |
| 6,415,338 B1 | * | 7/2002 | Habot .......................... | 710/22 |

* cited by examiner

*Primary Examiner*—Hassan Kizou
*Assistant Examiner*—Timothy Lee
(74) *Attorney, Agent, or Firm*—Myers Bigel Sibley & Sajovec

(57) ABSTRACT

Ethernet controller memory management systems and methods for memory management for an ethernet controller are provided which allocate blocks of memory based on the amount of data contained in the received ethernet frame. A linked list structure of frame descriptors is utilized for establishing the sequential blocks of allocated memory for data storage, however, the data pointers indicating the starting location of each sequential block of memory are dynamically updated through the use of a frame link detector circuit and methodology which establishes the correct pointer address in a next frame descriptor field based on adding a calculated length of the received data to an initial starting point memory address for the current frame descriptor memory block. Accordingly, the amount of memory allocated to reflect a respective frame descriptor for a particular received frame is limited to the necessary amount of memory to store the length of data received in the respective frame. Therefore, the prior art potential problem of a significant amount of unused memory may be overcome by the systems and methods of the present invention.

23 Claims, 6 Drawing Sheets

FIG. 1    PRIOR ART
| preamble | S F D | destination address | source address | length or ethertype | information data | F C S |
FIG. 2a    PRIOR ART
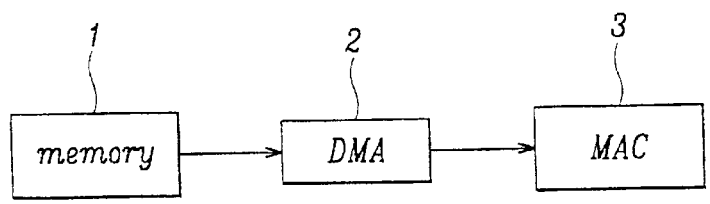
FIG. 2b    PRIOR ART
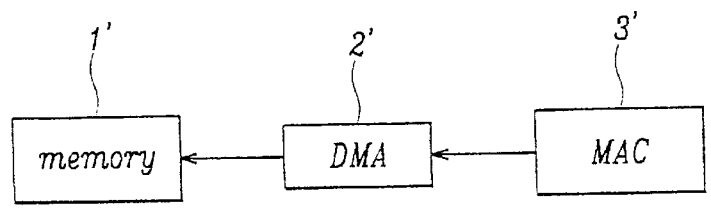

ETHERNET MEMORY MANAGEMENT SYSTEM AND METHODS FOR OPERATION THEREOF

FIELD OF THE INVENTION

The present invention relates to an ethernet controller memory management apparatus and its control method. More specifically, the present invention relates to an ethernet controller's memory control equipment that stores received data from the ethernet controller in memory and its control method.

BACKGROUND OF THE INVENTION

Communication networks such as computer networks are increasingly used in interconnecting a plurality of computers each of which independently executes tasks while communicating information over the network for shared use. The volume of information which may be transferred over such networks has increasingly become more demanding on the structure of the networks themselves. Various network devices are known to allow the connection of a greater number of computers to a single network and further to allow more free communication of information between computers or other devices on the network or on other interconnected networks. The protocols related to communication of information on a network typically further provide for checking whether or not various computers on the network are transmitting and/or receiving data within a single network or between different networks. Various hubs or repeaters are known which manage data exchanges within and between networks. As the number of devices on networks increases, the demands for high performance repeaters and other devices to meet the challenge of managing the information flow so that the data does not create a bottleneck effect on the network are increasingly required. Furthermore, the protocol supporting communications over such networks are typically evolving to support higher data rates and larger volumes of information transmittal over the communication networks.

One example of such a communication protocol is known as the ethernet protocol. FIG. 1 is a schematic diagram of a representative ethernet frame according to Institute of Electrical and Electronic Engineers (IEEE) 802.3 standard. Such ethernet networks typically use a Carrier Sense Multiple Access/Collision Detection (CSMA/CD) protocol as a collision detection and recovery mechanism. A CSMA/CD type computer (terminal) generally checks carriers on a transmission path of the network before transmitting frames. The computer then transmits a frame during what appears to the terminal to be an idle period on the transmission path. However, such networks allow collisions to occur when two different connected computers both attempt to transmit frames on the network at the same time. When the collision is detected, the ethernet protocol provides for collision recovery steps including stopping transmission of any remaining parts of a frame currently being transmitted and initiating retransmission of transmission frames which encounter the collision after some time interval which is typically specified by the collision detection recovery protocol in use on the network. Accordingly, as the CSMA/CD communication method involves the use of shared transmission media (or channels) the collision detection functions and the retransmission functions supporting frame transmission are preferably implemented in the physical layer and the data link layer of a multi-layer communications protocol as are known to those of skill in the art.

As shown in FIG. 1, an IEEE 802.3 ethernet frame generally includes a preamble, a starting frame delimiter (SFD), a destination address, a source address, a length or ethertype, information data, and a frame check sequence (FCS). The preamble is used to adjust bit synchronization to match the transmission and receiving speed of a transmitting device to the transmission and receiving speed of a receiving device. The SFD is a bit array used for frame synchronization which indicates the start of an available frame. The destination address indicates an address of a destination ethernet card controller to which the frame is to be transmitted. The source address indicates an address of the transmitting ethernet controller device. The length or ethertype indicates the length of information data contained in a frame or, alternately, determines ethernet types. The information data is the available data which is being communicated and may also contain padding, i.e., a portion filled with zeros (or ones) when the amount (length) of available data is less than a minimum length of a frame. The FCS is used to detect errors in a received frame, typically through the use of a check sum applied to the bits of the frame excluding the preamble and the SFD.

FIGS. 2a and 2b are schematic diagrams illustrating an ethernet controller respectively transmitting and receiving frames. Referring first to FIG. 2a, when transmitting data, a direct memory access (DMA) 2 in the ethernet controller reads data to be transmitted from a memory 1 and transmits the data to a media access control (MAC) 3 which is typically a sub-layer of the data link layer. The MAC 3 in turn transmits the data to the physical layer, adding the preamble, SFD, padding, and FCS. The central processing unit (CPU) (not shown) then typically provides predefined addresses of the transmitting device and the receiving device, which are stored in memory, to the DMA 2 during data transmission.

Referring to FIG. 2b, when receiving data, the MAC 3' transmits the data received from the physical layer to the DMA 2', typically excluding the preamble and SFD. The DMA 2' stores the received data in the memory 1' without requiring help from the CPU (not shown).

The CPU reports an address of the data to be transmitted and a storage address of the received data respectfully to the DMA 2, 2' through a frame descriptor at the time of transmitting and/or receiving data. More particularly, the frame descriptor is typically assigned to an associated memory location by the CPU, and read through the use of a frame descriptor pointer.

FIG. 3 is a schematic diagram illustrating a frame descriptor which may be used with existing ethernet controllers. The illustrated single frame descriptor 5 is mapped into a frame at the time of transmitting and/or receiving data. As shown in FIG. 3, the frame descriptor 5 includes a data pointer 5a, a status field 5b, a length field 5c, a control field 5d and a descriptor pointer 5e. The data pointer 5a may be a 32-bit pointer to indicate a first or starting address of a memory location where data received or to be transmitted is stored in memory. The status field 5b has bits to indicate a status of transmission and receiving and which may further indicate error types. The length field 5c indicates a length (amount) of data contained in the frame to be transmitted and/or received. The control field 5d is used to assign methods to transmit and receive frames. The descriptor pointer 5e has an address of a next frame descriptor which is next to (sequentially linked to) the current frame descriptor 5. In other words, a plurality of frame descriptors may be provided with a linked list sequential structure.

FIG. 4 is a schematic diagram representing operations related to the transmission and/or receipt of data over an ethernet protocol network using a frame descriptor as described with reference to FIG. 3 in the ethernet controller. As shown in FIG. 4, the frame descriptor pointer 10, independently from the frame descriptors 20 through 22, manages a plurality of frame descriptors 20, 21, 22 which are associated in a linked list structure. That is, the frame descriptor pointer 10 contains the address of the currently operative frame descriptor 20, and, when the current frame descriptor 20 is utilized to store or retrieve data for communication, the address contained in the frame descriptor pointer 10 is updated with a value of a descriptor pointer 20e, that is, a value indicating the address of a frame descriptor 21 coupled sequentially next to the current frame descriptor 20. As noted above, a plurality of frame descriptors 20 through 22 are allocated in predetermined areas of memory as a linked list structure by the CPU. At this time, the frame descriptor pointer 10 indicates the first frame descriptor.

Data to be transmitted are generally configured (located) in the memory 30 when received by the ethernet controller for transmission. However, during the reception of data from the network, predetermined uniform spaces, typically each of which is 1518-bytes long (the maximum length of data information in a frame), are allocated in order to store the received data.

Operations according to the ethernet controller of FIG. 4 will now be described. When transmitting data, the data to be transmitted is configured in the memory 30. A first address of the data to be transmitted is set in the data pointer 20a of the frame descriptor 20, and a length field 20c is set to the length of the data to be transmitted. The descriptor pointer 20e is set to an address of a frame descriptor 21 which is coupled next to the current frame descriptor 20 in the linked list structure. Finally, a transmission control bit of the control field 20d is set so that the data will be transmitted through the ethernet controller. When the data transmission is completed, a bit indicating the result of the transmission is typically set in status field 20b, and the frame descriptor pointer 10 is updated with a value of the descriptor pointer 20e in preparation for a next transmission.

When receiving data, the data input from the MAC 3' are received in association with the frame descriptor 20 which is identified by the frame descriptor pointer 10. That is, the received data is stored in the memory 30 area identified by the starting address contained in data pointer 20a. At this time, the length field 20c is set as the length of the received data, and the status field 20b shows the results of this data reception. When the data transmission is completed, the frame descriptor pointer 10 is updated with a value of the descriptor pointer 20e so as to point to the next frame descriptor 21. Operations repeat similarly with descriptor pointer 21e of frame descriptor 21 pointing to the next frame descriptor 22.

At this point, as the length of the data being transmitted generally cannot be known ahead of time. Therefore, the maximum receiving length is typically set in advance. The maximum length under the IEEE 802.3 standard is 1518 bytes. Therefore, the memory is allocated ahead of time into 1518-byte slots which are identified and sequentially linked using the frame descriptors 20, 21, 22. In other words, the start addresses of the allotted memory blocks are respectively set in the data pointer fields 20a, 21a, and 22a of the frame descriptors 20 through 22. For example, as shown in FIG. 4, when an address 1000 is set in the data pointer field 20a of the first frame descriptor 20, an address 2518 (which is 1518 bytes away from the first address) is set in the data pointer 21a of the second frame descriptor 21.

A disadvantage of this previously proposed memory management system is, that in the event that the length of data received in a frame is short (i.e., only 64 bytes), this data is stored in memory starting from the address 1000 (or the beginning of the memory area allotted for the first data element), and the remainder of the allotted memory in the block (area except these 64 bytes) will typically be unused. The next received frame data will be stored in memory beginning at the address 2518, the area of memory allotted to the second data element, and, therefore, there will be unused memory. In the event that the lengths of received data are short, the above-mentioned unused areas can be much larger than the used areas, so that memory is wasted.

SUMMARY OF THE INVENTION

It is, therefore, an object of the present invention to provide systems and methods for managing ethernet controller memory which may decrease memory loss and enhance memory management.

In order to provide for the foregoing and other objectives, ethernet controller memory management systems and methods for memory management for an ethernet controller are provided which allocate blocks of memory based on the amount of data contained in the received ethernet frame. A linked list structure of frame descriptors is utilized for establishing the sequential blocks of allocated memory for data storage, however, the data pointers indicating the starting location of each sequential block of memory are dynamically updated through the use of a frame link detector circuit and methodology which establishes the correct pointer address in a next frame descriptor field based on adding a calculated length of the received data to an initial starting point memory address for the current frame descriptor memory block. Accordingly, the amount of memory allocated to reflect a respective frame descriptor for a particular received frame is limited to the necessary amount of memory to store the length of data received in the respective frame. Therefore, the prior art potential problem of a significant amount of unused memory may be overcome by the systems and methods of the present invention.

In one embodiment of the present invention, an ethernet controller memory management system is provided including a frame position detector circuit operable to detect a frame position of a length field value from a received frame and a frame length detector circuit operable to read the length field value and to output a memory address for a next frame based on the length field value and a current memory address. The frame position detector circuit may include a frame start detector operable to detect a starting reference location within the received frame and a counter initialized responsive to the frame start detector and operable to count received frame units within the received frame.

In another embodiment of the present invention, the system further includes a buffer memory operable to store the current memory address and the memory address for a next frame and an update controller operable to output a bus request signal to a central processing unit (CPU) responsive to a first control signal from the frame length detector circuit and to output a second control signal to initiate output of the memory address for a next frame to a data bus responsive to a bus admit signal from the CPU. The buffer memory may also store the received frame. In addition, a linked list of memory location pointers may be provided for use in sequentially storing received frames. In this embodiment, the current memory address is contained in a first one of the memory location pointers and the memory address for a next frame is output to a next one of the memory location pointers in the linked list of memory location pointers. The received frame may include a frame descriptor and further frame may be an IEEE 802.3 protocol compliant ethernet frame received from an ethernet protocol network. The linked list may be a linked list of frame descriptors each of which includes an associated memory location pointer, a length field configured to indicate the length of an associated received frame and a pointer field to a next frame descriptor in the linked list of frame descriptors. In one embodiment, the frame descriptor further includes a status field to indicate status of the received frame and a control field to control receiving of the received frame.

In a further embodiment of the present invention the length field value is positioned within the frame descriptor a predetermined number of frame units after the starting frame delimiter. The frame start detector is operable to detect the starting frame delimiter and the frame length detector circuit is operable to read the length field value responsive to the counter having a value corresponding to the predetermined number of frame units.

In a further aspect of the present invention, methods and systems are provided for memory management for an ethernet controller. An ethernet frame is received which includes a length field value. The length field value of the received ethernet frame is read and a memory address for a next frame is generated based on the length field value and an associated memory address of the received frame. The length field value in one embodiment is read by initializing a counter responsive to a starting reference location in the received ethernet frame, incrementing the counter responsive to sequential frame units within the received ethernet frame and reading the length field value when the counter is incremented to a predetermined number associated with a position of the length field value in the received ethernet frame. The memory address for a next frame may be generated by summing the associated memory address of the received frame and the length field value.

In a further embodiment of the present invention, the memory management system determines whether the field length value has been successfully read and sets the memory address for a next frame to a predetermined address responsive to the determining step when the field length value is not successfully read. In this embodiment, the generation of the memory address for the next frame by summing is performed responsive to the determining step if the field length value is successfully read.

In another embodiment of the present invention, a next frame is received and stored at the memory address for a next frame. The storing may be provided by outputting a bus request signal to a CPU after the memory address for the next frame is generated, receiving a bus admit signal from the CPU and updating a pointer to the memory address for a next frame including placing the memory address for a next frame on a data bus and an address of the pointer on an address bus. In one embodiment, updating is performed using direct memory access (DMA) without operation of the CPU.

BRIEF DESCRIPTION OF THE DRAWINGS

FIG. 1 is a schematic illustration of an ethernet frame according to the Institute of Electrical and Electronic Engineers (IEEE) 802.3 standard;

FIG. 2a is a block diagram representing the transmission of frames with an ethernet controller according to the IEEE 802.3 standard;

FIG. 2b is a block diagram representing the receipt of frames with an ethernet controller according to the IEEE 802.3 standard;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one of skill in the art, the present invention may be embodied as methods or devices. Accordingly, the present invention may take the form of a hardware embodiment, a software embodiment or an embodiment combining software and hardware aspects.

Figure 3:
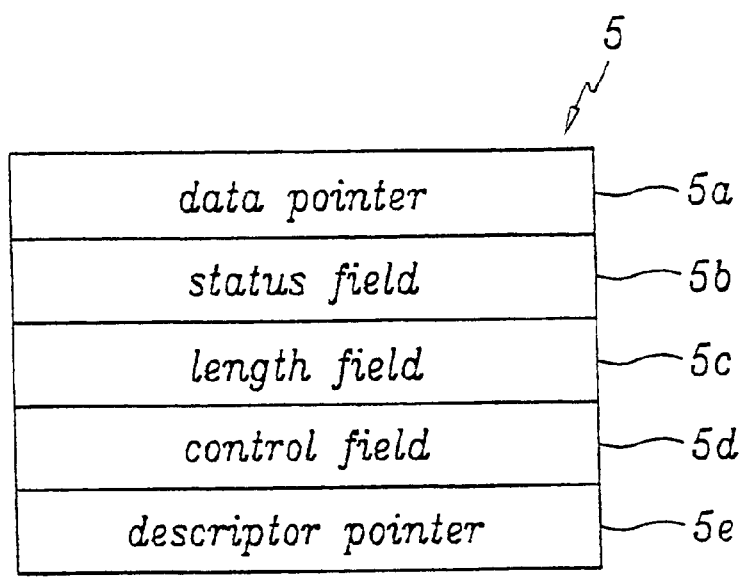
FIG. 3 is a schematic illustration of a frame descriptor used in an ethernet controller according to the IEEE 802.3 standard.
Figure 4:
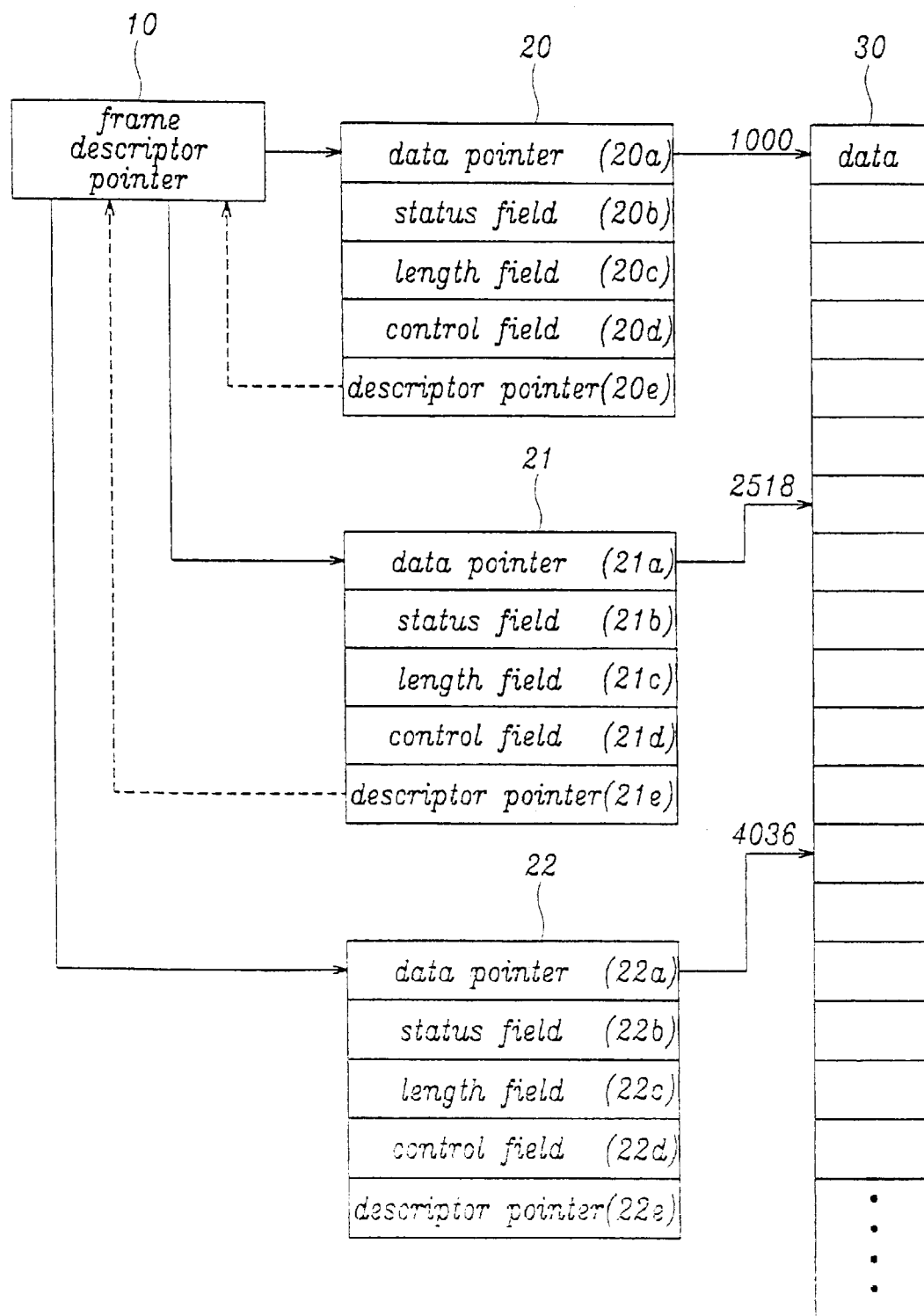
FIG. 4 is a schematic illustration of a method for transmitting and receiving data using a frame descriptor in an ethernet controller according to the IEEE 802.3 standard.
Figure 5:
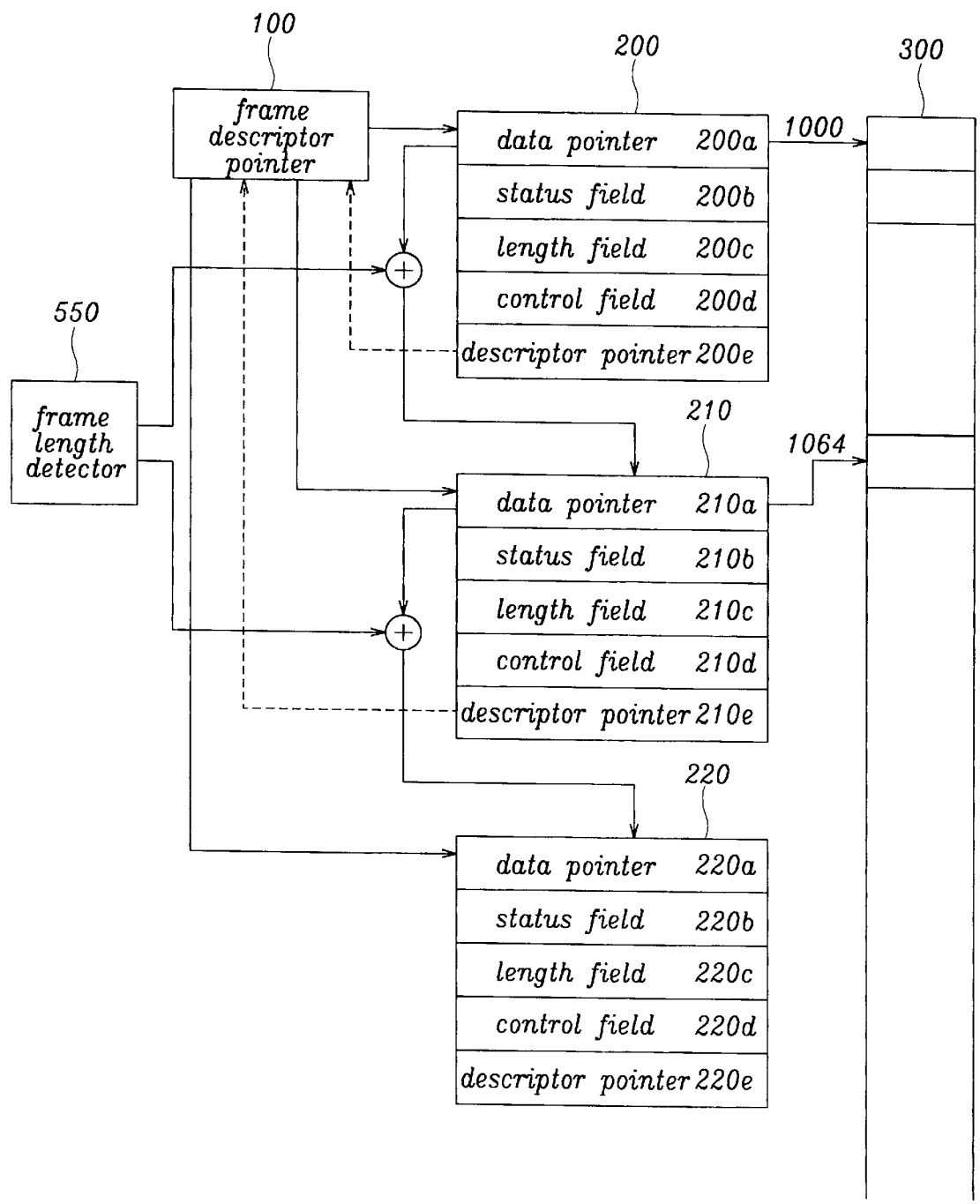
FIG. 5 is a schematic illustration of operations relating to the frame descriptor in a memory managing apparatus of an ethernet controller according to an embodiment of the present invention.

FIG. 5 is a schematic illustration showing memory management operations for an ethernet controller using a frame descriptor according to an embodiment of the present invention. As shown in FIG. 5, the memory management system includes a frame descriptor pointer 100, a plurality of frame descriptors 200 through 220 coupled in a linked list structure, a memory 300, and a frame length detector 550. During operations, the frame descriptor pointer 100 first identifies (points to) a first frame descriptor 200 in the linked list structure. A data pointer 200a of the first frame descriptor in turn identifies an address in the memory 300, for example, the address "1000" which is the current memory address. The frame length detector 550 reads the length field of the frame currently received to obtain the length field value (a length equal to 64 bytes in the illustrated example). Based on the current memory address summed with the read length field value, a data pointer 210a of the second (or next) frame descriptor 210 is set as 1064 which is the result of summing '1000' (the value of the current memory address) and '64', the length field value of the current frame detected by the frame length detector 550 to provide a memory address (1064)for the next received frame.

Figure 6:
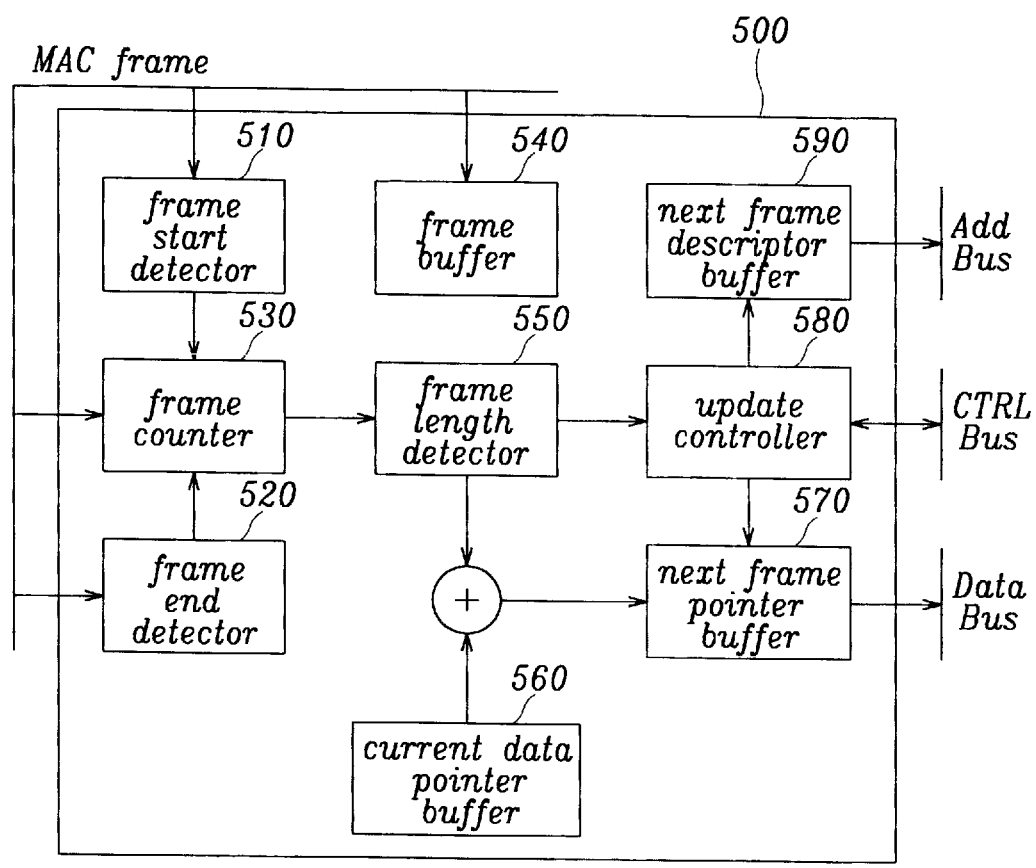
FIG. 6 is a block diagram illustrating a memory managing apparatus of an ethernet controller according to an embodiment of the present invention.

FIG. 6 is a block diagram illustrating a memory management system for an ethernet controller according to an embodiment of the present invention. As shown in FIG. 6, the memory management system 500 includes a frame start detector 510, a frame end detector 520, a frame counter 530, a frame buffer 540, a frame length detector circuit 550, a current data pointer buffer 560, a next data pointer buffer 570, an update controller 580, and a next frame descriptor buffer 590. The frame start detector 510 and the frame counter 530 provide a frame position detector circuit operable to detect a frame position of a length field value from a received frame. Frame buffer 540, next frame pointer buffer 570, current data pointer buffer 560 and next frame descriptor buffer 590 may be provided by allocated segments of a buffer memory associated with the ethernet controller.

The frame start detector 510 is operable to detect the starting reference location with a frame. The frame end detector 520 detects the end of a frame. The frame counter 530 is operable to count received frame units within a frame (i.e., received frame's bytes). The frame buffer 540 temporarily stores the received frames. The frame length detector 550 is operable to read the length field value of the received frame in order to output a memory address for a next frame. The current data pointer buffer 560 stores a value of the data pointer 200a of the current frame descriptor 200. The next data pointer buffer 570 stores a value of a computed data pointer 210a of the frame descriptor 210 coupled next to the current frame descriptor 200.

The update controller 580 outputs a control signal (such as a bus admit signal) to the CPU (not shown) such as over the control (CTRL) bus requesting that the value of updated data pointer is stored in the data pointer 210a of the next frame descriptor 210. The update controller 580 receives a corresponding bus admit signal from the CPU so that the memory managing system 500 may take control of an address bus (Add bus) and a data bus (Data Bus). The next frame descriptor buffer 590 has the address of the next frame descriptor 210, more particularly, of the data pointer 210a field of the next frame descriptor 210.

Figure 7:
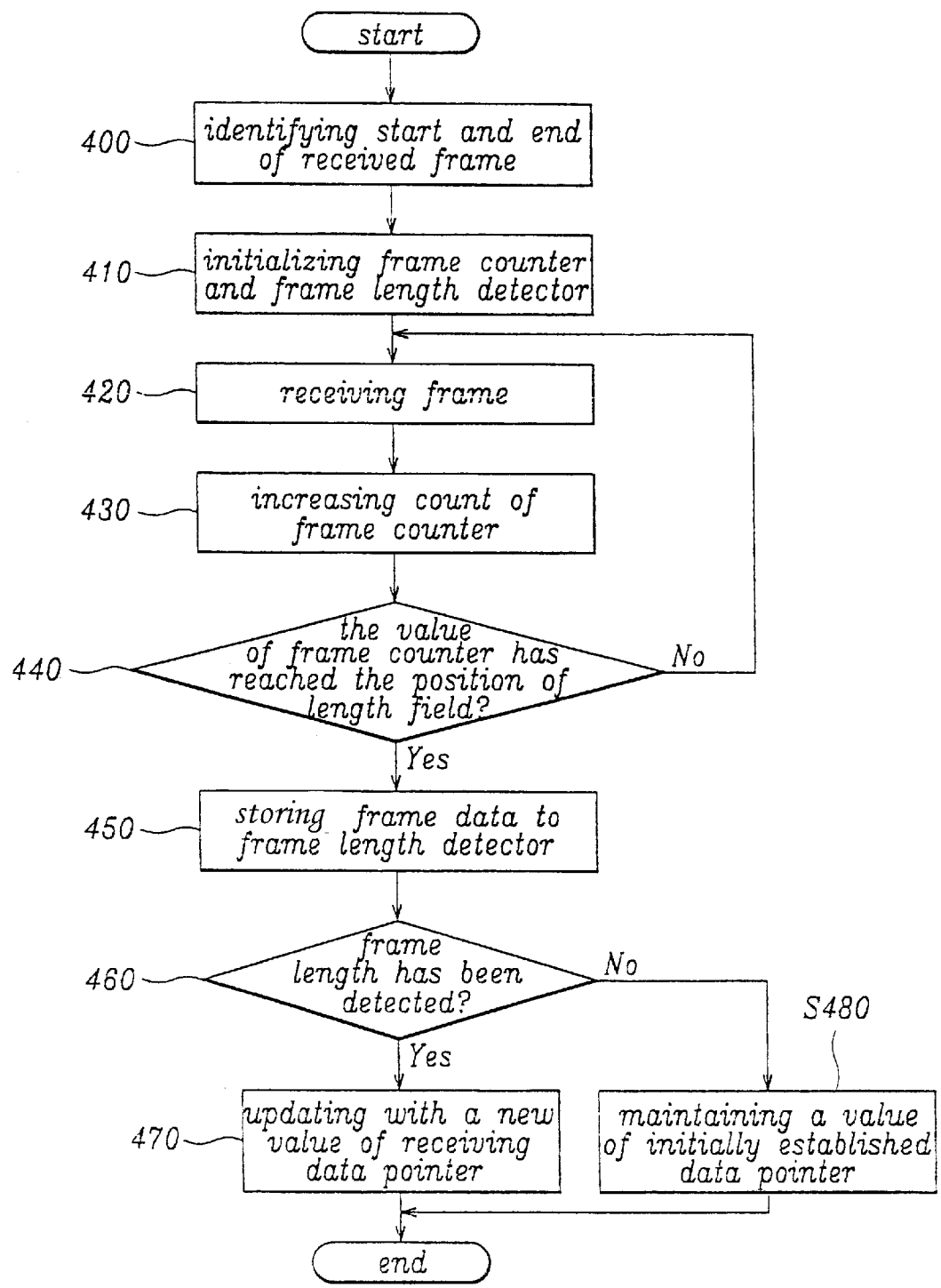
FIG. 7 is a flowchart illustrating operations for memory management of an ethernet controller according to an embodiment of the present invention.

Operations according to an embodiment of the present invention will now be further described with reference to FIG. 7. FIG. 7 is a flow chart illustrating operations for memory management of an ethernet controller according to an embodiment of the present invention. Operations begin at block 400 when the frame start detector 510 detects the SFD from the received frame in order to identify the start of the frame. In addition, the frame end detector 520 detects the FCS in order to identify the end of the frame (block 400). For operations in receiving an ethernet frame from a network, the frame counter 530 is initialized by the frame start detector 510 responsive to a detected starting location in the frame (block 410). In the illustrated embodiment, the values of '13' and '14' are set at the frame length detector 550. These values correspond to the position of the frame length field relative to the starting location as specified in the IEEE 802.3 frame format.

Frames are received per byte (frame unit), and are temporarily stored in the frame buffer 540 (block 420). The counts of the frame counter 530 are correspondingly incremented (which may include increased for a count up or decreased for a count down embodiment respectively) (block 430). The memory management system 500 determines whether or not the value of the frame counter 530 has reached '13,' (the position of the length field) based on the count (block 440). When the value of the frame counter 530 becomes '13,' the frame length detector 550 reads the 2-byte length field value (block 450), and then determines whether this value has been successfully detected at (block 460).

Operations for block 470 will now be described. If the field length value has been successful detected, the frame length detector 550 sums the value stored in the current data pointer buffer 560 and the field length value, and stores the result in the next data pointer buffer 570. The frame length detector 550 transmits a first control signal to the update controller 580. After receiving the first control signal, the update controller 580 outputs a bus request signal to a control bus (CTRL Bus). After receiving the bus request signal from the update controller 580 through the CTRL Bus, the CPU (not shown) outputs a bus admit signal. Responsive to the received bus admit signal, the update controller 580 outputs a second control signal to both the next frame descriptor buffer 590 and the next data pointer buffer 570. The next frame descriptor buffer 590 outputs an address of the next frame descriptor which receives and stores the second control signal to an address bus (Add Bus). The next data pointer buffer 570 receives the second control signal, and outputs a stored new data pointer value to a data bus (Data Bus). Accordingly, a data pointer value in the data pointer 210a of the next frame descriptor 210 is updated at block 470. If the field length value is not detected successfully (block 460), the value of the initially established data pointer 210a, such as a maximum data field default value (1000+1518) is maintained (block 480).

As noted above, when receiving variable length frames in the ethernet controller, the frame length field value is first detected, and then summed with the current memory address. This summed value is then used as a memory address to store the following frame. Accordingly, the present invention may decrease memory loss and improve memory management.

As will be appreciated by those of skill in this art, the above-described aspects of the present invention in FIGS. 5–7 may be provided by hardware, software, or a combination of the above. While various components of the memory management system 500 have been illustrated in FIG. 5 and 6, in part, as discrete elements, they may, in practice, be implemented by a processor, such as a microcontroller, including input and output ports and running software code, by custom or hybrid chips, by discrete components or by a combination of the above. For example, the frame length detector 550 may be contained within a processor (not shown) supporting other functions of the ethernet controller.

Operations of the present invention have been described above with the flow chart and schematic block diagrams of FIG. 5–7. It will be understood that each block of the flowchart illustrations and/or block diagrams and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart and/or block diagrams block or blocks. The computer program instructions may be executed by a processor to cause a series of operational steps to be performed by the processor to produce a computer implemented process such that the instructions which execute on the processor provide steps for implementing the functions specified in the flowchart and/or block diagram block or blocks.

Accordingly, blocks of the flowchart illustrations and block diagrams support combinations of means for performing the specified functions, combinations of steps for performing the specified functions and program instruction means for performing the specified functions. It will also be understood that each block of the flowchart illustrations and/or block diagrams, and combinations of blocks in the flowchart illustrations and/or block diagrams, can be implemented by special purpose hardware-based systems which perform the specified functions or steps, or combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. An ethernet controller memory management system comprising:
   a frame position detector circuit operable to detect a frame position of a length field value from a received frame; and
   a frame length detector circuit operable to read the length field value and to output a memory address for a next frame based on the length field value and a current memory address: and
   wherein the frame position detector circuit comprises:
   a frame start detector operable to detect a starting reference location within the received frame; and
   a counter initialized responsive to the frame start detector and operable to count received frame units within the received frame.

2. An ethernet controller memory management system comprising:
   a frame position detector circuit operable to detect a frame position of a length field value from a received frame;
   a frame length detector circuit operable to read the length field value and to output a memory address for a next frame based on the length field value and a current memory address;
   a buffer memory operable to store the current memory address and the memory address for a next frame; and
   an update controller operable to output a bus request signal to a central processing unit (CPU) responsive to a first control signal from the frame length detector circuit and to output a second control signal to initiate output of the memory address for a next frame to a data bus responsive to a bus admit signal from the CPU.

3. A system according to claim 2 further comprising a linked list of memory location pointers for use in sequentially storing received frames and wherein the current memory address is contained in a first one of the memory location pointers and the memory address for a next frame is output to a next one of the memory location pointers in the linked list of memory location pointers.

4. A system according to claim 3 wherein the received frame includes a frame descriptor and wherein the linked list is a linked list of frame descriptors each of which includes an associated memory location pointer, a length field configured to indicate the length of an associated received frame and a pointer field to a next frame descriptor in the linked list of frame descriptors.

5. A system according to claim 4 wherein the received frame is an IEEE 802.3 protocol compliant ethernet frame.

6. A system according to claim 4 wherein the buffer memory is operable to store the received frame.

7. A system according to claim 6 wherein the frame descriptor further includes a status field to indicate status of the received frame and a control field to control receiving of the received frame.

8. A system according to claim 1 wherein the received frame includes a frame descriptor which includes the length field value and a starting frame delimiter, the length field value being positioned within the frame descriptor a predetermined number of frame units after the starting frame delimiter and wherein the frame start detector is operable to detect the starting frame delimiter and wherein the frame length detector circuit is operable to read the length field value responsive to the counter having a value corresponding to the predetermined number of frame units.

9. A system according to claim 8 wherein the received frame is an IEEE 802.3 protocol compliant ethernet frame.

10. A system according to claim 8 wherein the received frame is received from an ethernet protocol network.

11. A system according to claim 8 wherein the received frame is received for transmission over an ethernet protocol network.

12. A method for memory management for an ethernet controller comprising the steps of:
    receiving an ethernet frame which includes a length field value;
    reading the length field value of the received ethernet frame; and
    generating a memory address for a next frame based on the length field value and an associated memory address of the received frame; and
    wherein the reading step comprises the steps of:
    initializing a counter responsive to a starting reference location in the received ethernet frame;
    incrementing the counter responsive to sequential frame units within the received ethernet frame; and
    reading the length field value when the counter is incremented to a predetermined number associated with a position of the length field value in the received ethernet frame.

13. A method according to claim 12 wherein the generating step comprises the step of:
    summing the associated memory address of the received frame and the length field value to provide the memory address for a next frame.

14. A method according to claim 13 wherein the generating step further comprises the steps of:
    determining whether the length field value has been successfully read;
    setting the memory address for a next frame to a predetermined address responsive to the determining step when the length field value is not successfully read; and
    wherein the summing step is performed responsive to the determining step if the length field value is successfully read.

15. A method according to claim 12 wherein the generating step is followed by the steps of:
    receiving the next frame; and
    storing the next frame at the memory address for a next frame.

16. A method according to claim 15 wherein the storing step comprises the steps of:
    outputting a bus request signal to a CPU responsive to the generating step;
    receiving a bus admit signal from the CPU; and
    updating a pointer to the memory address for a next frame including placing the memory address for a next frame on a data bus and an address of the pointer on an address bus.

17. A method according to claim 16 wherein the step of updating is performed using direct memory access (DMA) without operation of the CPU.

18. A method according to claim 14 wherein the receiving step comprises the step of receiving the Ethernet frame from an ethernet protocol network.

19. A memory management system for an ethernet controller comprising:

means for receiving an ethernet frame which includes a length field value;

means for reading the length field value of the received ethernet frame; and means for generating a memory address for a next frame based on the length field value and an associated memory address of the received frame; and wherein the means for reading comprises:

means for initializing a counter responsive to a starting reference location in the received ethernet frame;

means for incrementing the counter responsive to sequential frame units within the received ethernet frame; and means for reading the length field value when the counter is incremented to a predetermined number associated with a position of the length field value in the received ethernet frame.

20. A system according to claim 19 wherein the means for generating comprises:

means for summing the associated memory address of the received frame and the length field value to provide the memory address for a next frame.

21. A system according to claim 20 wherein the means for generating comprises:

means for determining whether the length field value has been successfully read; and means for setting the memory address for a next frame to a predetermined address responsive to the means for determining when the length field value is not successfully read.

22. A system according to claim 19 further comprising:
means for storing a next received frame at the memory address for a next frame.

23. A method for memory management for an ethernet controller comprising the steps of:

receiving an ethernet frame which includes a length field value;

reading the length field value of the received ethernet frame; and generating a memory address for a next frame based on the length field value and an associated memory address of the received frame;

wherein the associated memory address of the received frame is contained in a memory location pointer of one of a linked list of memory location pointers for use in sequentially storing received frames and wherein the method further comprises writing the memory address for a next frame in a next one of the memory location pointers in the linked list of memory location pointers; and wherein the linked list is a linked list of frame descriptors each of which includes an associated memory location pointer, a length field configured to indicate the length of an associated received frame and a pointer field to a next frame descriptor in the linked list of frame descriptors.

* * * * *